May 16, 1950 H. W. INGLE 2,508,251
GAUGE FOR GLASS CONTAINERS OR THE LIKE
Filed Oct. 30, 1946
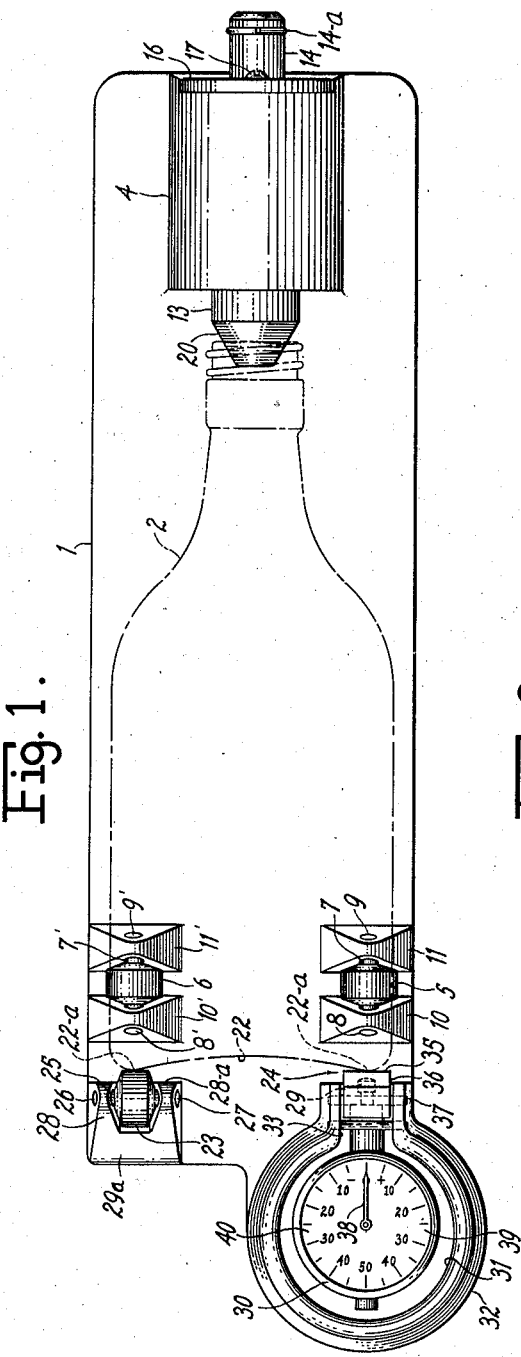
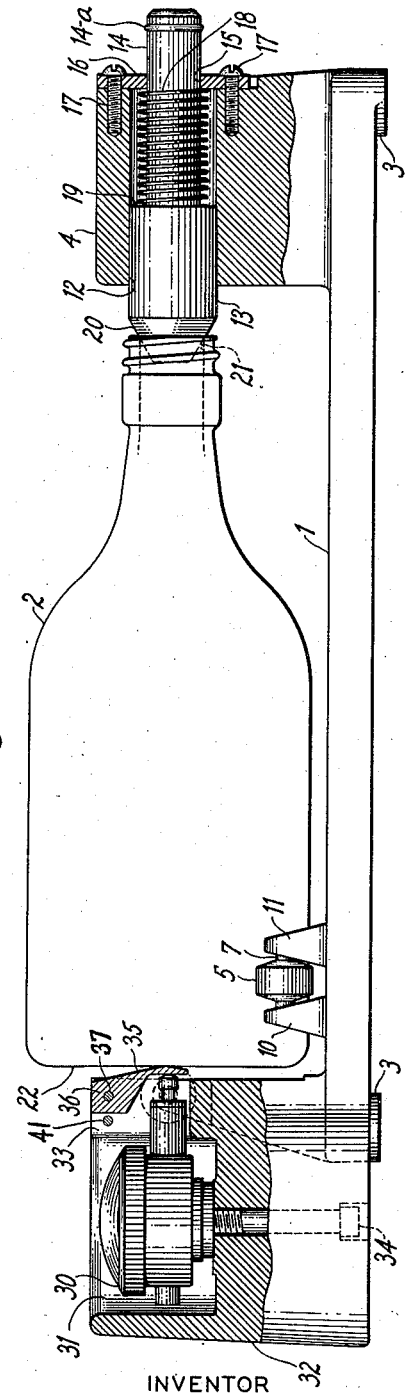
INVENTOR
HENRY W. INGLE
BY Parham & Bates
ATTORNEYS Patented May 16, 1950

2,508,251

UNITED STATES PATENT OFFICE 2,508,251

GAUGE FOR GLASS CONTAINERS OR THE LIKE

Henry W. Ingle, Windsor, Conn., assignor to Hartford-Empire Company, Hartford, Conn., a corporation of Delaware Application October 30, 1946, Serial No. 706,696

11 Claims. (Cl. 33—174)

This invention relates generally to devices for gauging articles, such as bottles, jars, or other containers, to determine whether or not such articles meet applicable requirements for commercial ware.

The invention relates more particularly to a gauge for gauging a glass container to determine whether or not its form or shape is sufficiently true to the applicable standard to assure proper positioning of the open upper end portion of the container when it stands on its bottom on a substantially horizontal support, as when presented to a filling tube or nozzle or capping mechanism of a machine in which the container is to be filled or capped. For example, a glass bottle or jar may be unsuitable for filling or capping because of some malformation or irregularity in the shape of its neck portion, its body, or its bottom which will cause its neck or open end portion to be objectionably inclined from the vertical or offset so as to be out of vertical alignment with its supporting bottom portion. A bottle which has its neck portion inclined from the vertical when the bottle stands upright on a horizontal supporting surface is commonly termed a "leaner" or "bent neck" and if the inclination from the vertical exceeds a prescribed tolerance, such bottle is unsuitable for filling or capping by a conventional filling or capping machine.

An object of the invention is to provide a conveniently usable, manual gauge by which a glass container having a round, i. e., substantially cylindrical body portion, can be quickly and accurately gauged to determine whether or not such container is an objectionable "leaner" or is otherwise unsuitable to be capped or filled by associate machinery because of some malformation or irregularity in the shape of a portion of the container.

Defects of the character above referred to in a glass container may be caused by some defect or abnormality or irregularity in the machine by which such containers are being made in rapid succession. The gauge of the present invention, while not limited thereto, is adapted and intended for use to gauge newly made glass containers to detect the consequences of such a condition in the container-producing machinery as reflected in the containers produced so that prompt corrective measures can be taken to minimize the production of defective containers.

Other objects and advantages of the present invention will hereinafter be pointed out or will become apparent from the following description of a practical embodiment of the invention, as shown in the accompanying drawings, in which:

Fig. 1 is a plan view of a gauge embodying the invention for use in gauging a narrow neck bottle, which is shown in gauging position in dot-and-dash lines; and Fig. 2 is a view, mainly in side elevation, of the gauge with portions thereof broken away and other portions shown in vertical section to reveal parts that would otherwise be hidden.

The supporting frame structure of the gauge shown in the drawings comprises a substantially horizontal body 1 which, when the article to be gauged is a bottle as indicated at 2, may be a substantially flat plate-like member of rectangular shape in cross section and of substantially greater length than width. This body 1 is shown as having flat supporting bosses 3 on its bottom, constituting short legs on which the body may be supported in a horizontal position on a table top or a like supporting surface (not shown). Obviously, the body 1 may be formed to rest flatwise directly upon such supporting surface.

On one end portion of the body 1 is an upstanding, integral boss or block 4 which is located intermediate the width of such body. This block carries a movable contact element, hereinafter described, for engaging the wall of the opening at the neck end of the bottle. Bottle side wall contact elements, in the form of rollers 5 and 6, respectively, are rotatably supported on the opposite end portion of the body 1 in relatively fixed positions at opposite sides of and equidistant from its longitudinal medial line. As shown, Fig. 1, the roller 5 is carried by a short horizontal shaft 7 which is mounted in aligned openings 8 and 9 in a pair of integral, upwardly projecting, longitudinally spaced ears 10 and 11, respectively, on the body 1 adjacent to one longitudinal, side edge of the body. The roller 6 is similarly supported on the body 1 adjacent to its other longitudinal, side edge. The elements of the mounting structure for the roller 6 are designated in Fig. 1 by the same reference numerals, primed, as used for the mounting structure for the roller 5. The rollers 5 and 6 have their axes parallel with each other and with the longitudinal medial line of the body 1.

The block 4 is provided with a horizontal opening 12 extending through such block above and parallel with the longitudinal medial line of the body 1. A plunger 13 is slidable in the opening 12 and has a reduced stem portion 14 projecting from the rear end of such opening through an opening 15 in a closure plate 16 which is fastened to the rear side of the block 4, as by the screws 17. A coil spring 18 encircles the stem 14 within the opening 12 between a shoulder 19 at the juncture of the plunger 13 and its stem and the closure plate 16 so as to urge the plunger continuously forward in the opening 12. A stop bead 14a on the rearwardly projecting end of the stem 14, by contact with the closure plate 16, will limit the spring-actuated forward projection of the plunger 13.

The plunger 13 has its forward end portion formed to be conical in shape, as indicated at 20, so as to be adapted to project into the open end 21 of the bottle 2 when the latter is disposed on its side, as shown in the drawings, and has its body resting upon the rollers 5 and 6 at places of contact which may be adjacent to the juncture of the side wall with the bottom of such bottle. The bottom, designated 22, of the bottle is also contacted at this time at its supporting portion, 22a, Fig. 1, by laterally spaced bottom contacts, 23 and 24, respectively, which are provided on the end portion of the body 1, in opposing relation to the bottle neck centering internal contact 20. The bottom contact 23 is located in a relatively fixed position on the frame body 1 and may be a roller similar to each of the rollers 5 and 6 except that its axis of rotation is at a right angle with the direction of length of the body 1. This roller 23 is shown as being disposed above the left-hand corner portion of the body 1, Fig. 1, and as being supported on a short shaft 25 which is supported in suitable aligned openings 26 and 27 in transversely spaced, upstanding ears 28 and 28a, respectively, on an integral block 29a on this portion of the body 1. Obviously, the roller 23, like rollers 5 and 6, may be rotatably supported on the body 1 in any suitable known manner, and these contacts, which occupy relatively fixed positions on the frame body 1, may be stationary contacts of any suitable known type instead of being rollers.

The contact element 24 comprises a rectilinearly movable stem 29 of a micrometer gauge 30 which is mounted in a suitable open-topped cavity or recess 31 in an integral upstanding boss or block 32 on a portion of the body 1. The wall of the cavity or recess 31 is vertically slotted or partially cut away at 33 to accommodate the stem portion of such gauge and the latter is held firmly, although releasably, in the cavity or recess 31, as by the fastening bolt 34. In the example shown, the contact element 24 also includes a protective hanging portion 35 which overlies the rearward, free end of the gauge stem 29 and has a forwardly formed attaching portion 36 pivotedly mounted upon a transversely extending pivot pin 37 in the upper part of the slot 33. The purpose of the portion 35 is to protect the gauge stem 29 against accidental injury by reason of lateral blow from the bottle 2 when the latter is being placed quickly in the gauging position shown in the drawings. The place of contact of the contact 24 with a portion of the bottom 22 of the bottle is above the right-hand corner portion of the frame body 1, at about the same level as the place of contact of the roller 23 with a diametrically opposite portion of the bottom surface of the bottle. These places of contact are at about the same level as the axis of the internal centering contact 20 and at opposite sides of and equi-distant from the extended axial line of such centering contact. The peripheries of the bottle side wall roller contacts 5 and 6 also are equi-distant from this extended axial line and are spaced therefrom a distance with which the radial distance from the axis of the body of the bottle to the outer periphery of the portion thereof resting upon said roller contacts is supposed to coincide.

The micrometer gauge 30 is a dial indicator which may be obtained as a commercial unit, being, in the example shown, an indicator known as the "Federal Dial Indicator, Model B-81," a product of the Federal Products Company, Providence, Rhode Island. This dial indicator includes a pivoted pointer, indicated at 38, Fig. 1, movable clockwise from the "zero" position shown by a retractive or inward movement of the stem 29 so as to cooperate with the "plus scale," indicated at 39, and movable counterclockwise from the "zero" position shown by an outward movement of the stem 29 so as to cooperate with the "minus scale" 40. These scales may be graduated to show variations of the linear measurements in five-thousandths of an inch, or in any other suitable unit. It will be understood that the stem is urged continuously by spring means (not shown) toward its fully projected position and may be retracted against such spring pressure by the camming action of the bottle bottom thereagainst as the bottle being gauged is rotated about its longitudinal axis and the contact 24 encounters a "rise" or "high spot" on the bottle bottom surface. The movable contact 24 will thus follow the up-and-down contour of the portion of the bottle bottom traversed as the bottle is rotated about its longitudinal axis and the dial indicator will show the character and extent of these variations, up-and-down, particularly in relation to a plane indicated by the "zero" position of the pointer 38.

A pin 41 may be secured transversely in slot 33 adjacent to portion 36 of contact 24. Pin 41 acts as a positive stop, limiting the swinging movements of contact 24 and thus preventing contact 24 from swinging upwardly out of its protective position relative to indicator stem 29.

Assuming that the pointer stood at "zero" at the beginning of a cycle of rotation of the bottle, it would of course remain there during the entire rotation of the bottle about its longitudinal axis if the bottle were perfect. The axis of the upper, open end of such a bottle would be vertical and in alignment with the central axis of the bottle bottom when the bottle stood upright on its bottom. In acual practice, however, perfect bottles are not likely to be formed so that it is important to determine in what way and to what extent a bottle fails to be perfect both to the end that bottles which exceed a prescribed tolerance should be rejected and that suitable corrective measures may be taken promptly to obviate or reduce objectionable particular defects.

The gauge of the present invention is a conveniently and quickly usable manual device by which a bottle such as that shown in the drawings may be tested to ascertain the nature and extent of particular defects thereof which would affect the position of the upper, open portion thereof when the bottle has been stood upright on a horizontal support. A workman making the test can ascertain, merely by observing the movements of the pointer on the dial of the gauge, the exact locations and extents of the relatively "high" and "low" places on the surface of the bottle supporting portion of its bottom, whether or not these are due to local defects in the bottle or to some defect in another portion of the bottle, such as a bent, offset or irregularly shaped neck portion, a bulge or sunken place in the bottle side wall, etc., and whether or not the defect is such as to require rejection of the bottle as a "leaner" or because its upper, open end portion would not be satisfactorily positioned if the bottle were standing on its bottom. With this information, the cause of each particular defect can be located and curative measures promptly taken, thereby reducing as much as possible loss from the production of bottles which cannot meet the exacting commercial specifications applicable thereto.

It will be understood that the illustrative gauge shown in the drawings and herein particularly described is for the particular glass article shown but that the principles of the invention as embodied in this gauge may be carried into effect to provide other specifically different gauges for containers or the like of specifically different shapes and/or sizes. Instead of the particular dial indicator shown, any other suitable known indicating device may be employed and the illustrative device may be altered or changed in other details which now will be apparent or will readily occur to those skilled in the art.

I claim:

1. A gauge comprising a supporting frame, means on said frame to support a hollow open-ended article, such as a bottle or jar, in a substantially horizontal position and for rotation about its longitudinal axis, said means including opposed contacts respectively in bearing contact with the open end and with the supporting portion of the opposite or bottom end of the rotatably supported article, the latter of said contacts being movable and positioned to follow "up-and-down" surface variations of the article bottom along the path traversed by said movable contact during a complete rotation of said article about its longitudinal axis, and indicating means operable by said movable contact to indicate said variations.

2. A gauge as recited in claim 1 wherein the first of said opposed contacts projects into the open end of said substantially horizontal article.

3. A gauge as recited in claim 1 wherein the first of said opposed contacts is a spring-pressed conical member projecting into the open end of said substantially horizontal article against the wall of the opening therein.

4. A gauge for a hollow article, such as a glass container having an opening at its end that is normally upper most, a bottom at its opposite end on which the article may stand when upright and a body portion which is substantially cylindrical adjacent to said bottom, said gauge comprising a supporting frame, a horizontally disposed article internal wall bearing contact supported on an end portion of said supporting frame so that said contact is turned toward the opposite end of said frame, a pair of transversely spaced respectively right-hand and left-hand article external side wall supporting contacts supported on said frame at places spaced longitudinally of said frame from said internal wall contact a distance sufficient to permit the substantially cylindrical portion of the body of said article to rest upon said external wall contacts when the article is disposed upon its side with the wall of its end opening in contact with said internal contact, said article then being manually rotatable about its longitudinal axis, article bottom bearing contact means supported on said frame, including a movable contact element located in general opposition to said internal wall contact in a position spaced radially from the center of said bottom surface such as to cause said movable contact element to traverse the annular supporting portion of the bottom surface of the article when the latter is rotated about its longitudinal axis in contact with said movable contact, and an indicator operable by said movable bottom contact element to show in terms of linear measurement up-and-down surface variations of the supporting portion of the bottom of said article when the latter is rotated about its longitudinal axis as aforesaid.

5. A gauge comprising a supporting frame comprising a substantially horizontal body of greater length than width, a rectilinearly movable, substantially horizontal bearing contact element mounted on an end portion of said substantially horizontal body above the longitudinal median line of the latter, said contact element having a free cone-shaped end portion turned in the direction of the opposite end of said body, a pair of respectively right-hand and left-hand supporting contact elements on said substantially horizontal body at places equi-distant from the longitudinal median line of said body and spaced longitudinally of the latter a substantial distance from the free end of the first named contact element, the radial distance from each of said second named contact elements to the extended axial line of the first named contact being approximately equal to the radial distance from the longitudinal axis to the outer peripheral body surface of a round-bodied glass container to be gauged so that the first named contact element may project centrally into the open end of said container when the latter rests upon its side in a substantially horizontal position upon said second named contact elements, a pair of relatively right-hand and left-hand contacts mounted on the second end portion of said frame body in general opposition to the first named contact and respectively positioned to bear against approximately diametrically opposite portions of the supporting surface of the bottom of said glass container when the latter is in the substantially horizontal supported position aforesaid, one of said last named contact elements being yieldingly movable in the direction of length of said container to follow "up-and-down" surface variations of the portion of the container bottom contacted thereby when said container is rotated manually about its longitudinal axis, and an indicator actuated by said movable last named contact element to indicate said variations.

6. A gauge as recited in claim 5 wherein the places of contact of said last named contact elements with the bottom of said container and the axial line of said first named contact element are all spaced above the level of the places of contact of the second named contact elements with the side wall of said container.

7. A gauge as recited in claim 5 wherein the places of contact of said last named contact elements with the bottom of said container and the axial line of said first named contact element are all located at approximately the same level.

8. A gauge as recited in claim 5 wherein the second named contact elements are rollers mounted in fixed positions on said frame body with their axes of rotation parallel with the extended axial line of the first named contact element.

9. A gauge as recited in claim 5 wherein the second named contact elements are rollers mounted in fixed positions on said frame body with their axes of rotation parallel with the extended axial line of the first named contact element and the second of the last named contact elements is a similarly mounted roller having its axis of rotation at a right angle with the direction of the extended axial line of the first named contact element.

10. A gauge as recited in claim 5 wherein said indicator is of a "dial-and-pointer" type.

11. A gauge comprising a supporting frame comprising a substantially flat horizontally disposed body, a spring-pressed longitudinally movable, substantially horizontal bottle mouth contacting and centering bearing contact element mounted on one end portion of said frame body, respectively right and left hand bottle side contacting and supporting elements located in fixed positions on said frame body, and means on the second end portion of said frame body to contact the bottom of a bottle resting on its side on said right and left hand side contacting elements to hold the mouth of said bottle against said first named contact elements while permitting manual rotation of said bottle about its longitudinal axis and to determine "up-and-down" variations in the surface of the supporting portion of the bottle bottom as the latter is rotated as aforesaid.

HENRY W. INGLE.

REFERENCES CITED

The following references are of record in the file of this patent:

UNITED STATES PATENTS

| Number | Name | Date |
|---|---|---|
| 2,331,987 | Leatherman | Oct. 19, 1943 |
| 2,352,091 | Fedorchak | June 20, 1944 |
| 2,353,813 | Deeren | July 18, 1944 |
| 2,407,062 | Darrah | Sept. 3, 1946 |
| 2,427,152 | Moore | Sept. 9, 1947 |